July 30, 1929.  R. C. SIMMONS  1,722,318
HEEL MACHINE
Filed Dec. 20, 1924  7 Sheets-Sheet 5

INVENTOR
Ralph C. Simmons
By his Attorney
Nelson W. Howard

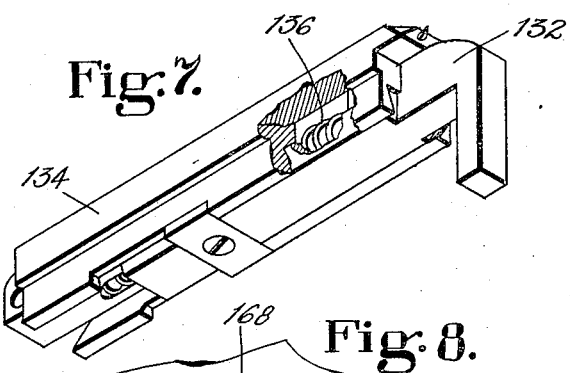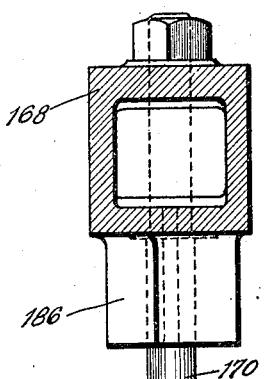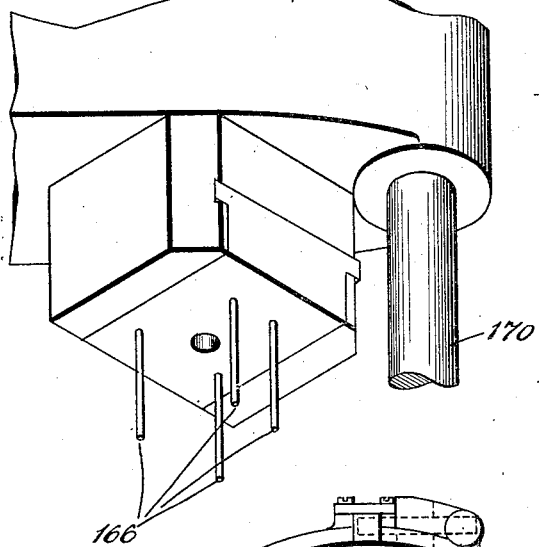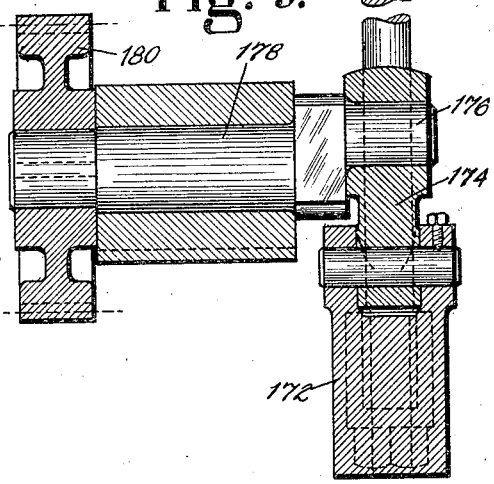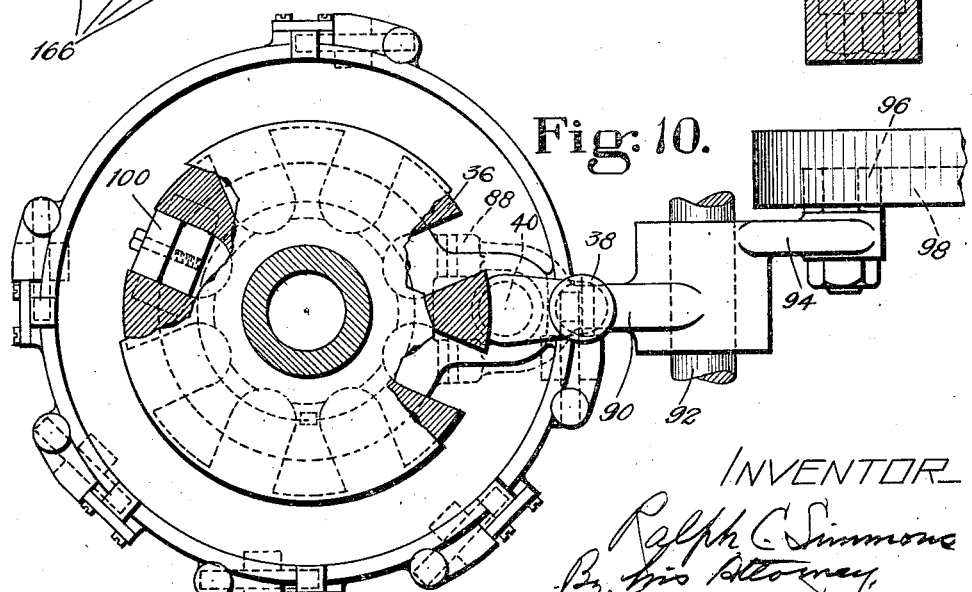

July 30, 1929.  R. C. SIMMONS  1,722,318
HEEL MACHINE
Filed Dec. 20, 1924    7 Sheets-Sheet 7
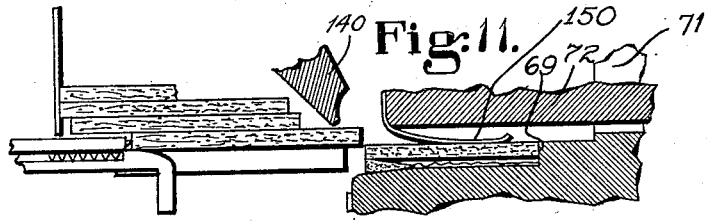
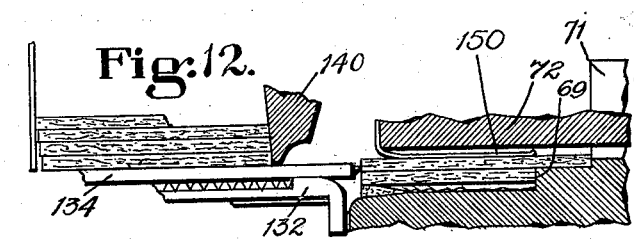
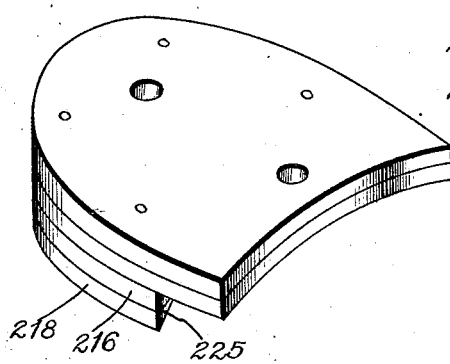
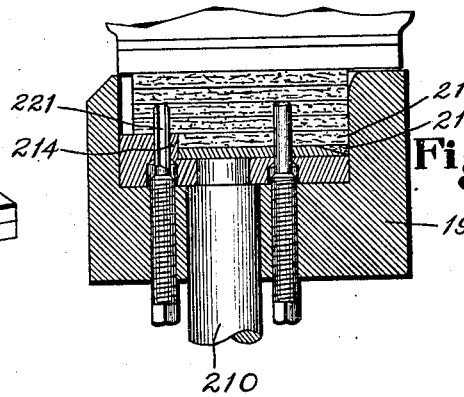
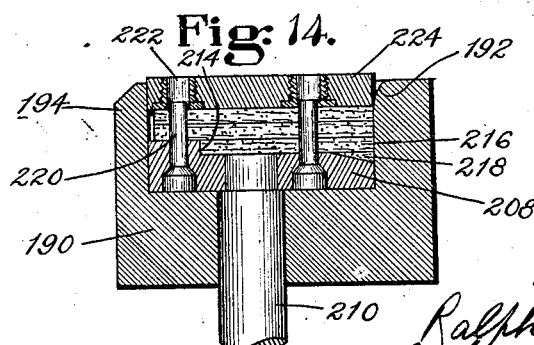
INVENTOR
Ralph C. Simmons
By his Attorney,
Nelson W. Howard Patented July 30, 1929.

1,722,318

UNITED STATES PATENT OFFICE.

RALPH C. SIMMONS, OF BEVERLY, MASSACHUSETTS, ASSIGNOR TO UNITED SHOE MACHINERY CORPORATION, OF PATERSON, NEW JERSEY, A CORPORATION OF NEW JERSEY.

HEEL MACHINE.

Application filed December 20, 1924. Serial No. 757,241.

This invention relates to heel machines, being herein illustrated as embodied in a machine for making heels, heel bases or heel sections for use in the manufacture of boots and shoes, and it should be understood that that the term "heel", as used in the following specification and claims includes, wherever the context permits, heel blanks in any of these forms.

The general object of the invention is to provide a compact and dependable machine for producing economically, at high speed, heels or heel sections of great uniformity. A particular object is to provide such a machine for producing heels having certain characteristics which conform to a predetermined standard by reason of which the heels are especially suited for use in the practice of the method of making shoes, involving the use of standardized parts, which is described and claimed in the copending application of George E Warren, Serial No. 476,659, filed June 11, 1921; although many features of the invention are useful and valuable in connection with heel machines generally, without regard to the particular kind or type of heel or heel blank to be produced or handled.

With the accomplishment of the above stated objects in view, the invention provides a machine in which are co-operatively combined mechanisms which assemble a plurality of lifts or blanks into a heel and form upon the assembled heel a standardized positioning surface or a plurality of such surfaces in predetermined relation to each other. In the illustrated embodiment of the invention there are provided positioning surfaces defined by jig holes which are located in predetermined relation to each other and to a surface or surfaces previously formed upon the breast portion of one of the blanks from which the heel is built. In the production of heels of good quality it is desirable that the heels be compressed, and a feature of the present invention consists in combining with a heel compressing mold means for providing the heel with positioning surfaces such as jig holes formed concurrently with the application of the compressing pressure. Another feature, contributing to speed and economy in operation, resides in the provision of means for transferring the heel directly from a holder, in which the lifts are assembled, to the mold in which the compressing pressure is applied.

The illustrated machine is capable of producing either whole heels or bases for rubber heels. Means is provided for driving heel building nails to secure the lifts together and, in the case of whole heels, for placing a top lift upon the head ends of the building nails, which are left projecting, and spanking the top lift down so that it becomes a permanent part of the heel.

Other features of the invention provide improvements which are applicable to heel machines generally and which aid in securing uniformity in product, dependability in operation, accessibility of the operating parts, and economy of space. To these ends one or more holders are arranged upon a carrier, preferably in the form of a rotating turret, and means operating radially of the carrier produces lifts from suitably arranged magazines and assembles them into the holders. The carrier may advantageously have a step-by-step movement and a feature of improvement in this connection consists in the provision of means for holding the growing pile of lifts under pressure during the movement of a holder from one lift receiving position to the next, thus providing simply and effectively for accurate relative positioning of the lifts and the holder.

Further features relating to the control of the lifts as they are fed from the magazines, the positioning of the lifts in the holders, and other improvements contributing to the efficient and satisfactory operation of machines of the class mentioned will be understood and appreciated from reading the following specification in connection with the accompanying drawings, in which Figure 1 is a view in side elevation of a machine in which the invention is embodied;

Fig. 7 is a perspective view, partly in section, of a detail of the lift feeding mechanism;

Fig. 8 shows a detail of the nail driving cross head;

Fig. 9 is a sectional view of a detail of the mechanism for operating the nail driving cross head;

Fig. 10 shows a detail of the operating mechanism for the turret;

Figs. 11 and 12 show the lift feeding mechanism in two successive positions;

Figs. 13 and 14 are sectional views of alternate forms of the compressing and punching dies; and Fig. 15 is a perspective view of one form of heel base section which may be made by the machine.

Figure 1:
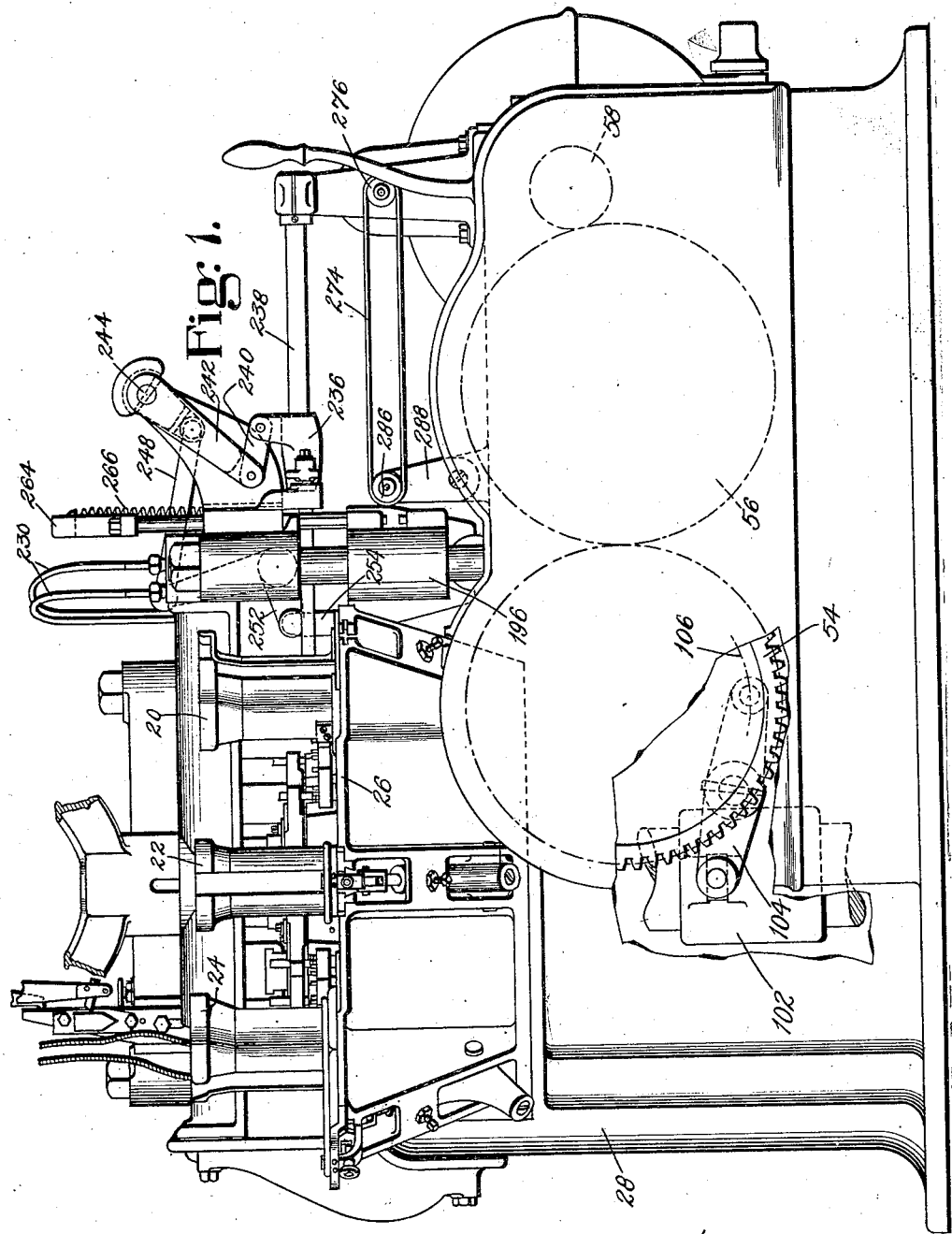

As illustrated in the drawings, the machine is organized to produce the article shown in Fig. 15, which is a three lift and rand base section for rubber heels intended for use in the manufacture of shoes of the type disclosed in the Warren application to which reference has already been made, such base section consisting of two full size lifts, a short base lift and a rand. The machine is provided with a series of lift magazines 20, 22, 24 which are supported with their lower ends at successively higher elevations upon a stationary table 26 mounted upon a base or frame 28 which carries the operating mechanism of the machine. The magazines are arranged in an arc of a circle surrounding a rotatable turret 30, see Fig. 2, which is journaled upon a stationary upright 32 to rotate in a horizontal plane.

Figure 2:
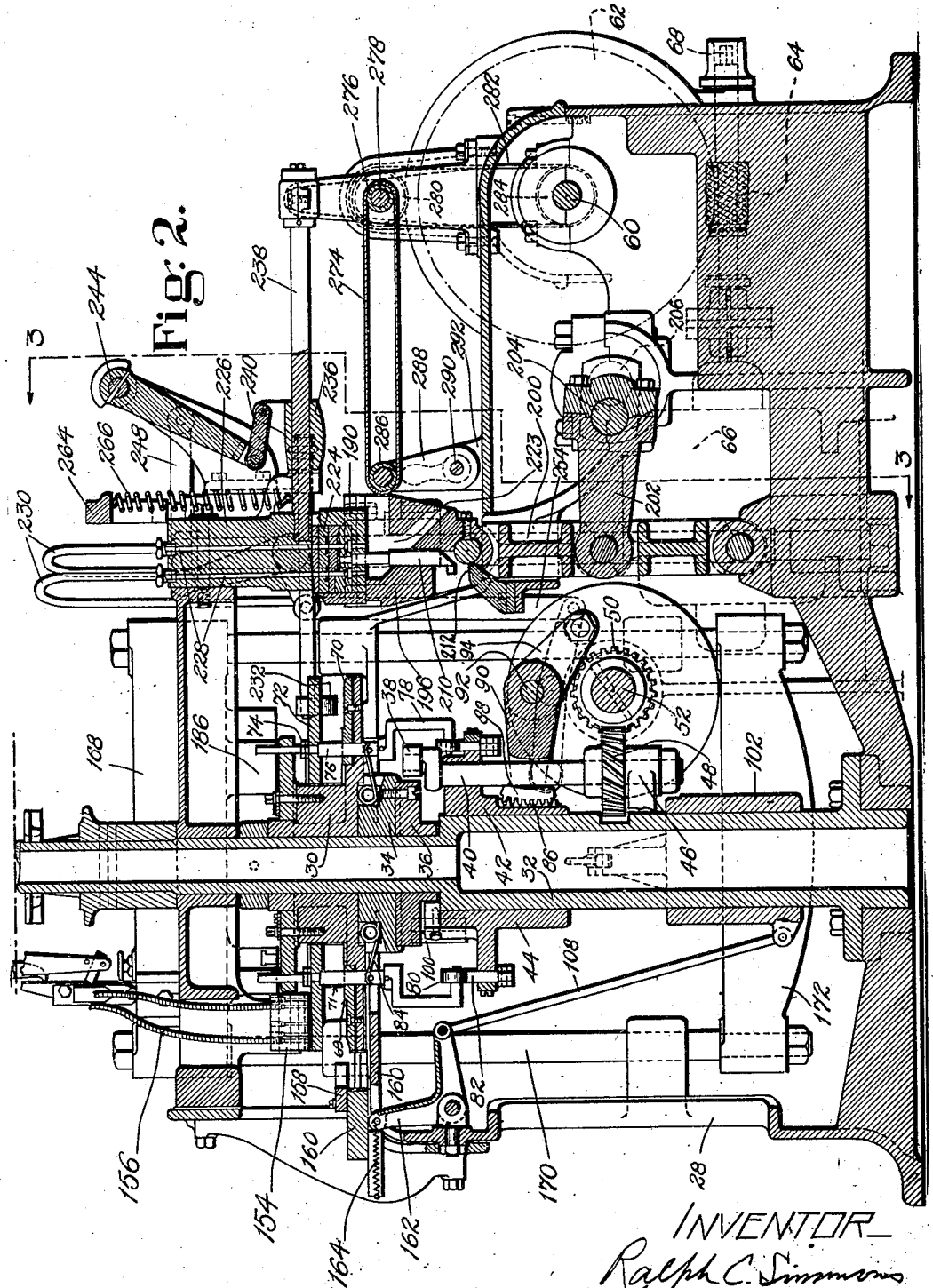
Fig. 2 shows a longitudinal central vertical section of the machine, the section being taken on the line 2—2 of Fig. 3.

The turret is supported by a hub 34 to which it is secured and with which it rotates. Rotation of the turret is produced by a Geneva gear the star wheel 36 of which is bolted to the under side of the hub 34 and the pin wheel 38 of which is operated by a vertical shaft 40 journaled in an upper bearing 42, formed in a head 44 which is slidable vertically upon the upright 32, and a stationary lower bearing 46. Secured to the shaft 40 is a gear 48 which meshes with a gear 50 secured to a horizontal shaft 52 to which is also secured a gear 54. As shown in Figs. 1 and 2, the gear 54 meshes with, and is driven by, a similar gear 56 which is, in turn, driven by a pinion 58 secured to the driving shaft 60. To the opposite end of the said driving shaft is secured a worm gear 62 driven by a worm 64 upon the shaft of an electric motor 66 or other suitable source of power. The end of the motor shaft is squared, as shown at 68, to permit the mechanism to be turned over with a hand crank if desired.

The star wheel 36 has 8 notches in its periphery with the result that during each revolution of the shaft 40 the turret 30 is rotated through ⅛ of a revolution. By this mechanism the turret is moved intermittently although it derives its motion ultimately from the continuously running driving shaft 60. The turret 30 carries eight equally spaced heel holders or clamps, each of which embodies a base plate 70 and a clamping plate 72. The base plate 70 constitutes a work support, or the work supporting element of the clamp or holder. This work support has a pair of offset abutments or gages 69 and 71, constructed and arranged to be engaged respectively by the breast edges of the short lift and the long lifts, to position the lifts in such relation to each other than a rabbeted heel blank is produced. The clamping plates 72 are vertically movable at predetermined times, namely, during the periods of rest in the intermittent rotation of the turret, to release from pressure the heel blanks contained in the holders and again to apply pressure to the blanks during the rotary movement of the turret. To this end each clamping plate 72 is secured by a nut 74 to a vertically slidable rod 76. The lower end of the rod 76 carries a yoke 78 upon which is a roll 80. A series of vertically adjustable strikers 82, equal in number to the number of heel clamps, is carried by the head 44 which is movable vertically but not horizontally. The strikers 82 are so positioned that the rolls 80 rest upon them when the turret is in any one of its positions of rest. The rods 76 are depressed by springs 84.

Vertical movement is imparted to the head 44 during periods of rest in the rotation of the carrier by mechanism comprising a rack 86 upon the head and a gear segment 88 at the end of a rocker arm 90 mounted upon a rock shaft 92 to which is also secured a cam arm 94, see Figs. 2 and 10. The arm 94 carries a cam roll 96 which engages a cam 98 upon the shaft 52. The design of the cam 98 and the bearing 48, 50 is such that the head 44 is caused to rise and descend once during each revolution of the Geneva pin wheel shaft 40, and this occurs during the time when the pin wheel 38 is out of engagement with the star wheel, at which time the turret is at rest. Also mounted upon the head 44 is a locking block 100 which engages in one of the notches of the star wheel and locks the same against rotation while the head 44 is rising and descending.

It will be apparent that, while the turret 30 is at rest, the clamping plates 72 are raised and lowered by the engagement of the strikers 82 with the rolls 80 during the rise and fall of the head 44 and that the amount of movement of the clamping plates may be regulated by adjustment of the strikers in the head 44. During the periods of rest of the turret, and while the clamping plates 72 are elevated, various lifts or elements of the blank to be produced are fed automatically into the blank holders. The supply of lifts or blank elements is contained in the various magazines from which the said elements are fed one or more at a time as required. The details of the lift feeding mechanism are best illustrated in Figs. 2, 5, 11 and 12. A sleeve 102 surrounding the upright 32 is reciprocated vertically, at the proper time to effect the lift feeding movement while the turret 30 is stationary and the clamping plates 72 elevated, by a cam lever 104 actuated by a cam cut in the inner face of the gear 54, a portion of the center line of the path of the cam being indicated at 106 (see Fig. 1). The sleeve 102 is connected by a series of links 108 to as many individual feeding mechanisms as there are magazines from which blanks are to be fed. As these feeding mechanisms are all similar it will be sufficient to describe one of them in detail. A slide 110 is supported and guided in the table 26 to move radially of the machine. A rod 112, pivoted to the slide 110, telescopes into an arm 114 arranged to rock in a vertical plane about a stationary pivot 116 upon which is also journaled a rocker arm 118 pivotally connected to the upper end of the link 108. A spring pressed plug 120, normally engaging in a depression in the hub of the rocker arm 118, locks the said rocker arm and the arm 114 together sufficiently to cause them to move as a unit as long as there is no undue resistance to the movement of the arm 114 but permits relative movement between the two said arms when there is such undue resistance and thereby avoids the danger of breakage of the parts of the machine in the event that an obstruction is encountered in the feeding of the lifts and, furthermore, permits the use of a stop screw 122 to adjustably predetermine the limit of the retracting movement of the slide 110.

Figure 5:
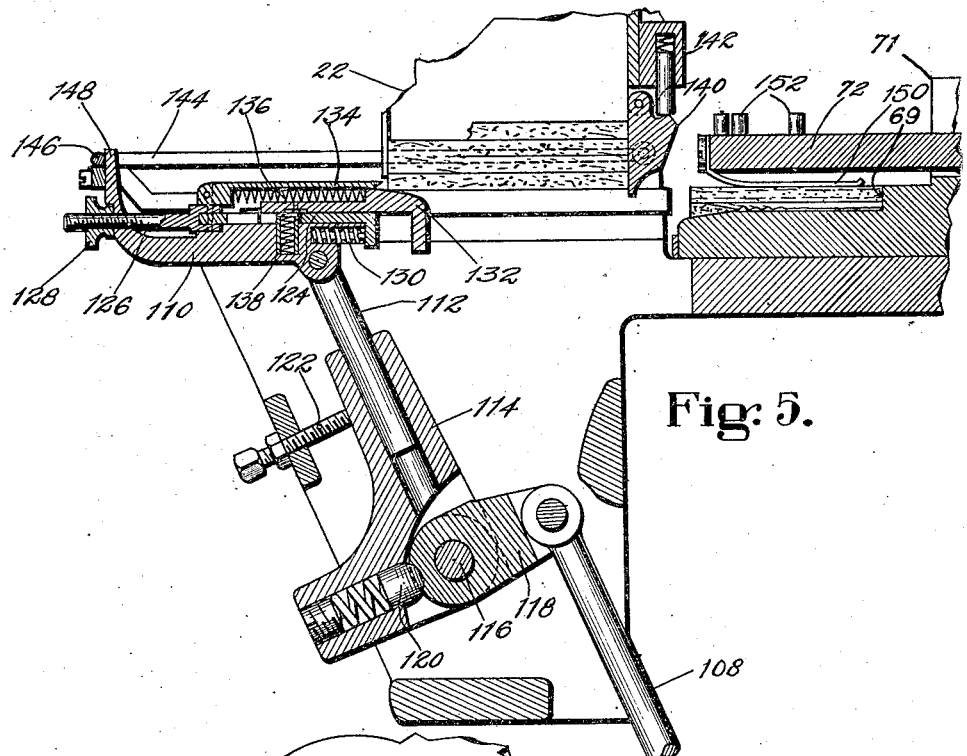
Fig. 5 is a sectional view of a portion of one of the lift magazines and the lift feeding mechanism.

Mounted upon the slide 110 is a plate 124 to which is connected a threaded rod 126 having an adjusting nut 128 screwed upon it. A compression spring 130 housed in a recess in the slide 110 bears against a depending portion of the plate 124, tending to keep the said plate forward, in relation to the slide, to a limit determined by the adjustment of the nut 128. Pivotally mounted upon the plate 124 is a finger 134 having sharpened points arranged to engage the rear edge of the lowermost lift in the magazine and feed it forward. Slidably mounted upon the underside of the finger 134 is a member 132 having a rounded nose arranged to engage under the edge of the lowermost lift in the magazine 22. A compression spring 136 tends to keep the member 132 in the relation to the finger 134 in which it is shown in Fig. 5 but permits the member 132 to yield backward to the position shown in Fig. 12 when it encounters any substantial resistance. A spring 138 acting on the under side of the member 132 tends to lift the said member and the finger 134 slightly to insure proper engagement of the parts with the rear edge of the lift, to the end that the lift may be engaged and fed with accuracy and certainty.

At the outlet side of the magazine 22 a hinged gate 140, acted upon by a spring pressed pin 142, bears against the breast edges of several lifts in the bottom of the magazine, keeping them in vertical alinement. A loop member 144, the front ends of which are pivoted to the gate 140 has its bight portion 146 arranged to be engaged by a lug 148 projecting upwardly from the slide 110 when the slide is retracted to the limit. This insures a positive operation of the gate 140 even though the spring tension upon it may not be sufficient to overcome the resistance to its movement offered by the friction between several misplaced lifts.

During the operation of feeding a lift from the bottom of the magazine, the parts assume the successive positions shown in Figs. 5, 11 and 12. Fig. 5 shows the member 132 and the feeding finger 134 supporting and engaging the rear edge of the lift about to be removed from the magazine. As the movement of the slide 110 in a right-hand direction occurs, the member 132 and the feeding finger 134 move together to slide the lift along. The gate 140 is raised, by the lift, sufficiently to permit the lift to pass under it and drags on the top of the lift, preventing the superposed lifts from being dragged from the magazine by the lowest one. When the lift reaches a point where the gate 140 snaps down behind it the gate engages the breast edges of the superposed lifts with a blow, forcing them backward toward alinement. The lift being operated upon is delivered into one of the heel clamps, as shown in Fig. 12, beneath a leaf spring 150 which exerts sufficient pressure upon the lift to hold it and keep it under control even though the clamping plate 72 is raised. The lift is forced by the finger 134 against the breast gage of the heel clamp and is thus accurately positioned, and straightened if it has turned angularly in transit from the magazine. The slide 110 is next retracted and, when the lug 148 engages the loop 144 at 146, the gate 140 is positively positioned and the lifts near the bottom of the stack are exactly alined, the parts now being again in the positions shown in Fig. 5, ready for feeding the next lift from the magazine.

Each of the clamping plates 72 has a series of nail tubes 152 in it so that it is really a nailing die as well as a clamping plate. After a clamp has had the lifts assembled in it from the magazines to form the required heel blank the turret stops with the clamp beneath a nail delivering block 154, see Fig. 2, to which a gang of nails is delivered through tubes 156 from any suitable automatic nail delivering device. At this position a fork 158 carried by a slide 160, moves into engagement with the rounded rear end of the heel blank in order to aline the lifts or elements thereof accurately before they are nailed together. The slide 160 is actuated by a bell crank lever 162 which is yieldingly connected to the slide by a spring 164. The lever 162 is actuated from the head 102 through one of the links 108.

The next position in which the clamp with the heel blank in it stops is beneath a gang of nail drivers 166 which are carried by a cross head 168 mounted upon side rods 170 connected together at their lower ends by a cross beam 172. A connecting rod 174, (Fig. 9), transmits movement from a crank pin 176, operated by a crank shaft 178, to the beam 172 and, consequently, to the cross head 168 and the nail drivers. A gear 180 upon the crank shaft 178 meshes with and is driven by a gear 182 upon the shaft 52 and the timing is such that the nails are driven through the blank while the turret and heel clamps are stationary. If a blank such as that shown in Fig. 15 is being produced the nails are driven until their heads are flush with the surface of the top lift.

It may be desired to produce a complete blind nailed heel, in which event the head ends of the nails will be left protruding and a top lift will be fed in above them from a top lift magazine 184 at the next station at which the heel clamp stops. At the next station the clamp with the nailed blank and the unattached top lift resting upon the projecting nail heads stops beneath a spanking block 186 which is carried by the cross head 168. When the cross head descends to drive the nails in the blank at the fifth station the top lift is spanked upon the nails projecting from the blank at the seventh station.

At the eighth, and last, station the blank is automatically removed from the heel clamp and transferred to the mold in which it is compressed and punched. This mold is located outside of the circular path in which the heel blanks move and will now be described. A mold base block 190, having a rear wall which is rounded or inclined at 192 and a breast wall 194, is mounted upon a cross head 196 to which vertical sliding movement upon guide rods 198 is imparted by a toggle 200. The toggle is operated by a connecting rod 202 and a crank 204 upon a crank shaft 206 to which the gear 56 is keyed.

A heel seat die 208, normally resting in the bottom of the mold, has secured to it a depending stem 210 arranged to engage a stationary abutment 212, mounted upon the machine frame, when the cross head 196 descends. This causes the heel seat die to stop while the remainder of the mold descends, with the result that the compressed blank is ejected from the mold. When a blank of the type shown in Fig. 15 is to be produced the heel seat die 208 is provided with a shoulder 214 against which the breast edge of the short lift 216 and the rand 218 are positioned in a manner which will be more fully described hereinafter. A pair of punches 220 is mounted in the die 208, and, as shown in Fig. 14, these punches cooperate with dies 222 in a tread die 224 which is supported by a stationary beam 226 mounted upon the upper ends of the guide rods 198. Continuous passages 228 through the tread die and the beam 226 lead into tubes 230 through which are conducted away the punchings produced by the punches 220.

For transferring the heel blanks from the clamps upon the turret 30 to the mold a pair of grippers 232 secured to the ends of shafts 234 are arranged to engage the sides of the blank resting upon the base plate 70, seizing the blank, transferring it to and depositing it in the compressing mold. The shafts 234 are mounted in a slide 236 which is guided for horizontal movement upon a stationary rod 238 and, in addition to reciprocating movement in a direction radial to the turret 30, provision is made for rocking the shafts 234 to cause the grippers 232 to seize and release the blank at the proper times.

Reciprocating movement of the slide 236 in proper time relation to the parts with which it co-operates is effected by mechanism which will now be described. The slide is connected by a link 240 to a rocker arm 242 secured to a rock shaft 244 to which is also secured an arm 246. The arm 246 is connected by a link 248 to one arm 250 of a bell crank lever, the other arm 252 of which is connected by a rod 254 to a cam lever 256 pivoted to the machine frame and carrying a cam roll which engages in a cam path in the inner face of a cam disk 258 secured to the gear 182. It will be understood that the cam disk 258 rotates with the shaft 52 and, therefore, causes reciprocation of the slide 236 in proper time relation to the intermittent movements of the turret 30.

Figure 3:
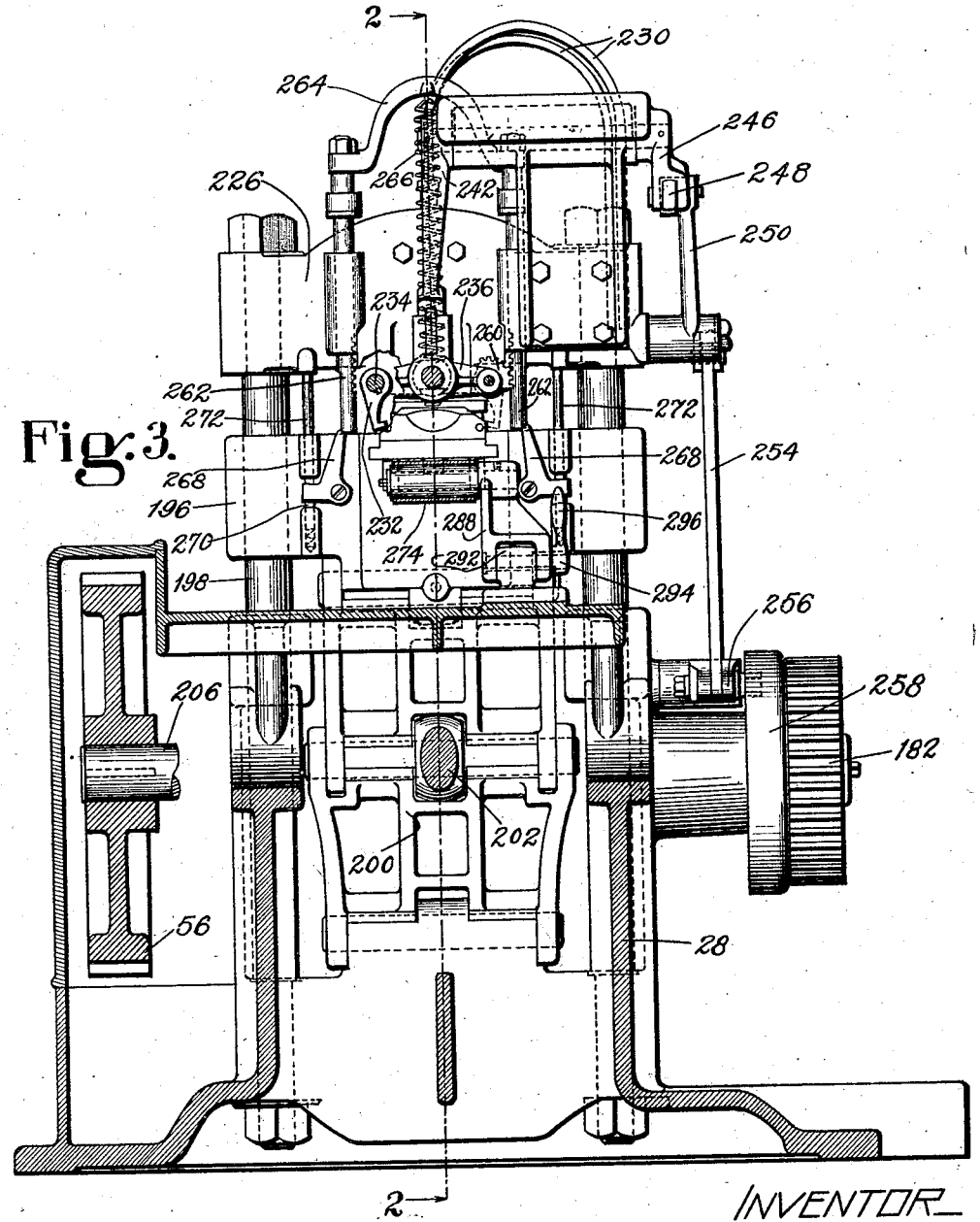
Fig. 3 is a transverse section on the line 3—3 of Fig. 2.
Figure 4:
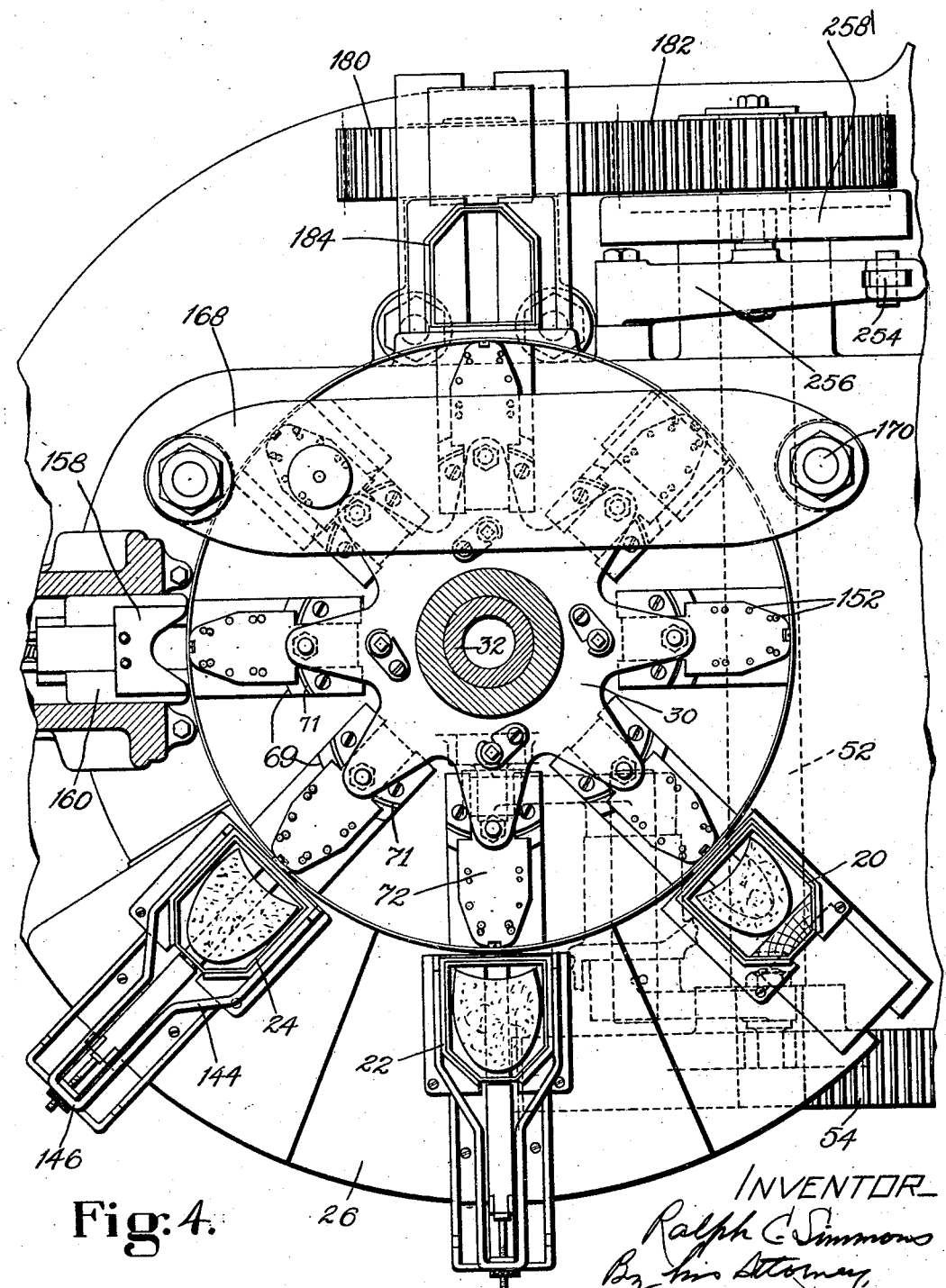
Fig. 4 is a plan view, partly in section, of part of the machine.

The shafts 234 are splined, as shown in Fig. 3, and the grippers 232 are keyed to their inner ends. Their outer ends are journaled for rotation in the slide 236, and each of the splined shafts is arranged to slide easily through a gear 260 which meshes with a vertically movable rack 262. The purpose of this construction is to actuate the grippers 232 to seize or release the heel blanks, this being accomplished by reciprocating the rack bars 262. The two rack bars 262 are connected together at their upper ends by a yoke 264 and a pull string 266, one end of which is connected to the yoke and the other end of which is connected to a stationary point on the machine, tends continually to draw the rack bars downward until their lower ends engage the cross head 196. Upon the cross head are pivoted dogs 268 and spring pressed pins 270 which tend to tip the dogs until they engage beneath the lower ends of the rack bars 262. Stationary rods 272 depending from the stationary beam 226 are engaged by the dogs and throw the latter out of engagement with the rack bars when the cross head 196 approaches the upper limit of its movement.

The timing of the various mechanisms is such that the grippers 232 are opened, moved inwardly and closed upon a blank in one of the clamps 70, 72 while the turret is at rest. The slide 236 is then moved outward, the grippers carrying the blank out of the heel clamp and into position over the mold 190, the cross head 196 being down at this time. As the cross head begins to rise the rack bars 262 are lifted, immediately opening the grippers and depositing the blank upon the die 208 which is still stationary. During the continued rise of the cross head the mold rises relatively to the die 208 and its stem 210, lifting the said stem off the abutment 210 after the die 208 has been seated upon the bottom of the mold. When the heel encounters the tread die 224 it is forced against the shoulder 214 by the inclined rear wall 192 of the mold.

After the blank is compressed and elevated from the mold, the grippers again seize it and carry it outward to a delivering position where they are opened to release the blank, allowing it to drop upon a conveyor belt 274 which discharges it from the machine. The belt 274 is run continuously and is actuated by a roll 276 upon a shaft 278 upon which is also a pulley 280 driven by a belt 282 from a pulley 284 upon the shaft 60. The inner end of the conveyor belt 274 is supported by an idler roll 286 journaled in an arm 288 which is pivoted at 290 to a stationary bracket 292. The arm 288 is swung manually into a position to tighten the belt 274 and secured in that position by a clamping nut 294 having a handle 296 for convenient operation. When it is desired to change compressing molds the nut 294 may be loosened and the arm 288 swung downward out of the way.

Figure 6:
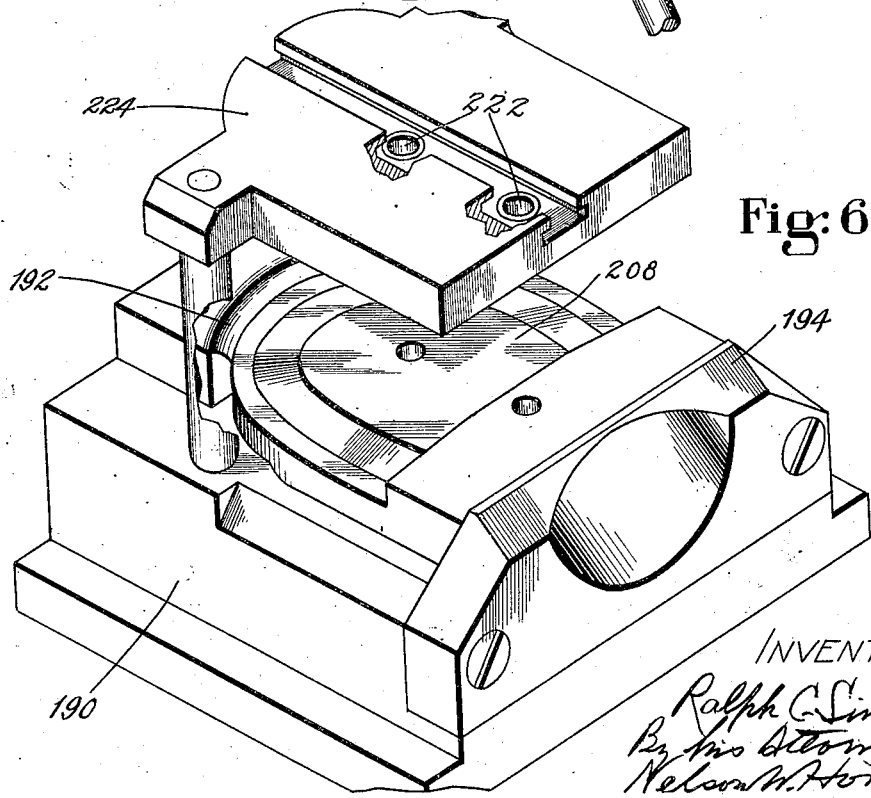
Fig. 6 is a perspective view of one form of the heel compressing and punching dies.

The mold and punch arrangement illustrated in Figs. 6 and 14 is suitable for use in making heel bases or other blanks in which it is desired that the holes shall be punched all the way through the blank. If it be desired to produce a blank in which the holes extend only partly through the blank the mold shown in Fig. 13 may be used. In this modification hollow tubular punches 221 are employed. These punches are threaded into the mold base member 190 to provide for adjustment to vary the depth of the holes to be punched. The cross head 196 is chambered out, as shown at 223, Fig. 2, to provide for the escape of the punchings which, in this instance, pass downward through the hollow punches 221. In producing standardized heels of the type illustrated in Fig. 15 the magazine 20 may be supplied with blanks, each of which consists of a previously assembled base lift 216 and rand 218 with an accurate positioning surface 225 formed thereon. These blanks may be produced in any suitable manner but are preferably manufactured in the machine described and claimed in my co-pending application Serial No. 7,399, filed Feb. 6, 1925. The assembled heel fits sufficiently tightly between the rear wall 192 of the mold and the positioning shoulder 214 to insure that the surface 225 of the blank shall be positioned accurately against the said shoulder. Since the shoulder is located in a fixed predetermined relation to the punches 220 or 221 the positioning surfaces formed by the said punches will, in all heels, bear a fixed, standardized relation to the positioning surface 225, adapting the heel perfectly for use in the manufacture of shoes by the process which is the subject-matter of the Warren application heretofore referred to.

Having described the invention, what is claimed as new and desired to be secured by Letters Patent is:—

1. In a heel machine, the combination of means for assembling a plurality of lifts or blanks into a heel, and means for forming a standardized positioning surface upon the assembled heel.

2. In a heel machine, the combination of means for assembling a plurality of lifts or blanks into a pile to constitute a heel, and means for forming a plurality of positioning surfaces upon the heel in predetermined relation to each other.

3. In a heel machine, the combination of means for assembling a plurality of lifts or blanks into a pile to constitute a heel, means for securing said lifts or blanks together, and means for forming a plurality of positioning surfaces upon the heel in predetermined relation to each other.

4. In a heel machine, the combination of means for positioning a heel with the aid of a positioning surface previously formed thereon, and means for forming upon said heel another positioning surface in predetermined relation to said previously formed positioning surface.

5. In a heel machine, the combination of means for positioning a heel with the aid of a positioning surface previously formed thereon, and means for forming a jig hole in said heel in predetermined relation to said surface.

6. In a heel machine, the combination of means for positioning a heel with the aid of a positioning surface previously formed thereon, and means for forming in the heel a plurality of jig holes in predetermined relation to each other and to said surface.

7. In a heel machine, the combination of means for assembling a plurality of lifts to form a heel, and means for punching a jig hole in the heel.

8. In a heel machine, the combination of means for assembling a plurality of lifts to form a heel, and means for punching in the heel a plurality of jig holes in predetermined relation to each other and to the breast of the heel.

9. In a heel machine, the combination of a mold, means for applying pressure to a heel in the mold, and means for forming jig holes in the heel concurrently with the operation of the pressure applying means.

10. In a heel machine, the combination of a mold, means for applying pressure to a heel in the mold, and means for forming a positioning surface upon the heel concurrently with the operation of the pressure applying means.

11. In a heel machine, the combination of a mold, means for applying pressure to a heel in the mold, and means for forming a plurality of positioning surfaces upon the heel concurrently with the operation of the pressure applying means.

12. In a heel machine, the combination of means for applying pressure to a heel, and means for forming a plurality of positioning surfaces upon the heel concurrently with the operation of the pressure applying means.

13. In a heel machine, the combination of a holder, means for assembling a plurality of lifts into the holder to form a heel, a heel compressing mold, and means for transferring a heel from the holder to the mold.

14. In a heel machine, the combination of a holder, means for assembling a plurality of lifts into the holder to form a heel, a heel compressing mold, and means for transferring a heel directly from the holder to the mold.

15. In a heel machine, the combination of a holder in which lifts may be assembled to form a heel, a heel compressing mold, means for transferring a heel from the holder to the mold, means for applying pressure to the heel in the mold, and means for conducting the compressed heel away from the mold.

16. In a heel machine, the combination of means for assembling a plurality of lifts to form a heel pile, means for driving heel building nails through the pile, leaving the head ends of the nails projecting, and means for spanking a top lift upon the projecting nails.

17. In a heel machine, the combination of means for assembling a plurality of lifts to form a heel pile, means for driving heel building nails through the pile, leaving the head ends of the nails projecting, means for placing a top lift upon the projecting nails, and means for spanking the top lift upon the said nails.

18. In a heel machine, the combination of a carrier movable step by step through a plurality of stations, means for depositing lifts, one upon another, upon the carrier at successive stations, means for driving nails through the lifts at another station, leaving the ends of the nails projecting, means for depositing a top lift upon the projecting nails at another station, and means for spanking the top lift upon the nails at another station.

19. In a heel machine, the combination of a carrier movable step by step through a plurality of stations, means for depositing lifts, one upon another, upon the carrier at successive stations, means for securing the lifts together at another station, and means at another station for applying pressure to the heel thus produced.

20. In a heel machine, the combination of means for assembling a plurality of lifts to form a heel pile, means for driving heel building nails through the pile, leaving the head ends of the nails projecting, means for spanking a top lift upon the projecting nails, and means for forming positioning surfaces in predetermined relation upon the heel thus produced.

21. In a heel machine, the combination of means for assembling a plurality of lifts to form a heel pile, means for nailing the lifts together, leaving the ends of the nails projecting, means for spanking a top lift on the projecting nails, and means for punching jig holes in the heel thus produced.

22. In a heel machine, the combination of a rotatable turret, a holder upon the turret in which lifts may be assembled to form a heel pile, lift assembling feeders operating radially of the turret for assembling lifts into a pile in the holder, a nail feeder for delivering a nail to the heel pile, a nail driver, and mechanism for operating the driver to drive the nail through the heel pile.

23. In a heel machine, the combination of a rotatable turret, a holder upon the turret in which lifts may be assembled to form a heel pile, lift assembling feeders for assembling lifts into a pile in the holder, a nail feeder for delivering a nail to the heel pile, a nail driver, a top lift feeder, and a top lift spanker constructed and arranged to spank a top lift upon the heel pile.

24. In a heel machine, the combination of a rotatable turret, a plurality of heel holders arranged about the periphery of the turret, a series of blank holders disposed in cooperative relation to the turret, and delivering means operating radially of the turret for delivering a series of blanks from said blank holders in succession to one of said heel holders.

25. In a heel machine, the combination of a rotatable turret, a plurality of heel holders arranged about the periphery of the turret, and blank transferring means operating radially of the turret to assemble blanks simultaneously into a plurality of said holders.

26. In a heel machine, the combination of a rotatable turret carrying a plurality of holders in which lifts may be assembled to form heels, a source of supply of previously formed heel lifts, and blank transferring means for removing lifts from the source of supply and assembling them simultaneously into a plurality of said holders by movements in their own planes.

27. In a heel machine, the combination of a rotatable turret carrying a plurality of holders in which lifts may be assembled to form heels, a series of lift magazines outside of the periphery of said turret, and feeding means operating radially of the turret for feeding lifts from the magazines inwardly to the holders.

28. In a heel machine, the combination of a rotatable turret carrying a plurality of holders in which lifts may be assembled to form heels, a series of lift magazines arranged outside of the turret and concentric therewith, means for rotating the turret intermittently through distances equal to the separation of the magazines, the stopping positions of the turret being such that the heel holders are adjacent to the magazines, and means for feeding a lift from each magazine radially of the turret into the adjacent heel holder at each pause in the rotation of the magazine.

29. In a heel machine, the combination of a movable carrier, a holder upon said carrier in which lifts may be assembled to form a heel, means for feeding a series of lifts to said holder at successive lift-receiving positions of the carrier, and means for holding the growing pile of lifts in the holder during each movement of the latter from one lift receiving position to the next.

30. In a heel machine, the combination of an intermittently movable carrier with a holder in which lifts may be assembled to form a heel, means for delivering a lift to the holder at each pause in the movement of the carrier, and means for holding the growing pile of lifts in the holder under pressure during the entire period of each step of the movement of the carrier.

31. In a heel machine, the combination of an intermittently rotatable turret carrying a plurality of holders in which lifts may be assembled to form heels, a plurality of lift magazines, means for simultaneously feeding lifts from said magazines to said holders during pauses in the rotation of the turret, and means for holding the heel piles in the holders under pressure during the periods of movement of the turret.

32. A heel machine having, in combination, two mechanisms arranged in series for performing successive operations upon a heel, means for transferring the heel from one mechanism to the other comprising a clamping device movable in the intervening space for gripping the heel by its lateral surface, constructed and arranged to close automatically upon the heel and be positively opened to release the heel, and actuating mechanism for said clamping device operated from one of said mechanisms.

33. In a machine for making rabbeted heels, the combination of a source of supply of lifts of different lengths, a work support having a pair of offset abutments constructed and arranged to engage the breast edges of the respective lifts, means for feeding the lifts successively into superposed relation upon said support and into engagement respectively with said abutments and means for securing the lifts together while so positioned.

34. In a machine for making rabbeted heels, the combination of means for assembling a plurality of lifts into a heel having a rabbet in the breast portion of its heel seat face and means for forming a jig hole in predetermined relation to the rabbet.

35. In a machine for making rabbeted heels, the combination of a mold having a shoulder to engage a corresponding shoulder in the rabbet of a heel and an inclined surface opposite said shoulder and means for forcing a heel along said surface and thereby firmly against the shoulder of the mold.

36. In a machine for making rabbeted heels, the combination of a mold, including a heel seat die having a shoulder to engage a corresponding shoulder on a heel adjacent to its breast and having a punch projecting from the heel engaging face of said die in predetermined relation to said shoulder on the die and a mold member having an inclined surface to engage the rear edge of the heel, and means for forcing the heel along said surface and thereby bringing its shoulder firmly against the shoulder of the die and for simultaneously forcing the heel on to the punch to form a jig hole in the heel in predetermined relation to the shoulder of the rabbet.

In testimony whereof I have signed my name to this specification.

RALPH C. SIMMONS.